United States Patent [19]

Uejyukkoku et al.

[11] Patent Number: 5,786,406
[45] Date of Patent: Jul. 28, 1998

[54] POLYOLEFIN BASED CROSSLINKED FOAM

[75] Inventors: Nario Uejyukkoku, Shiga-ken; Yukinari Nakatsu, Otsu, both of Japan

[73] Assignee: Toray Industries, Inc., Tokyo, Japan

[21] Appl. No.: 598,245

[22] Filed: Feb. 8, 1996

[51] Int. Cl.$^6$ .................. C08F 36/04; C08J 9/04
[52] U.S. Cl. .................. 521/50.5; 521/140; 521/143; 521/146; 521/148; 521/150
[58] Field of Search .................. 521/50.5, 140, 521/143, 150, 146, 148

[56] References Cited

U.S. PATENT DOCUMENTS

| | | | |
|---|---|---|---|
| 4,510,031 | 4/1985 | Matsumura et al. | 521/50.5 |
| 5,057,252 | 10/1991 | Kagawa et al. | 521/140 |
| 5,110,842 | 5/1992 | Uejikkoku et al. | 521/140 |
| 5,387,620 | 2/1995 | Park et al. | 521/143 |
| 5,554,694 | 9/1996 | Crow | 521/140 |

FOREIGN PATENT DOCUMENTS

| | | |
|---|---|---|
| 61-228033 | 10/1986 | Japan . |
| 5-331246 | 12/1993 | Japan . |
| 5-345833 | 12/1993 | Japan . |

*Primary Examiner*—John M. Cooney, Jr.
*Attorney, Agent, or Firm*—Birch, Stewart, Kolasch & Birch, LLP

[57] ABSTRACT

A polyolefin based crosslinked foam excellent in impact absorbability, vibration absorbability and heat insulation, which can be used for various kinds of industrial applications such as materials for the interior of automobiles, cushioning, building, furniture, home use electric appliances, which foam comprises:

a polyolefin based resin (A), and a conjugated diene polymer (B) having the peak tan $\delta$ value (obtained by dynamic viscoelasticity measurement) between $-20°$ C. and $40°$ C.

This invention also relates to a method for manufacturing said impact and vibration absorbable crosslinked foam.

The polyolefin based crosslinked foam of this invention is excellent in impact absorbability and vibration absorbability while keeping moldability and heat resistance over a wide range of degrees of crosslinking.

34 Claims, No Drawings

POLYOLEFIN BASED CROSSLINKED FOAM

FIELD OF THE INVENTION

The present invention relates to a polyolefin based crosslinked foam. In more detail, the present invention relates to a polyolefin based crosslinked foam excellent in impact absorbability, vibration absorbability and heat insulation, which can be used for various kinds of industrial applications such as materials for the interior of automobiles, cushioning, building, furniture, home use electric appliances.

BACKGROUND OF THE INVENTION

In recent years, polyolefin based crosslinked foams have been widely used as materials for cushioning, automobile interiors, buildings, home appliances, etc. since they are light, excellent in heat insulation and sound proofing and can be easily molded by various processes.

The conventional polyolefin based crosslinked foams are variously adjusted in heat resistance, cushionability and impact absorbability by properly selecting the degree of crosslinking, expansion ratio and thickness. However, the high crystallinity of the resin makes their impact resilience high, thus, not allowing their vibration absorbability to be high simultaneously. As general tendencies, heat resistance is better at a higher crosslinking degree, impact absorbability is higher at a higher expansion ratio, and vibration absorbability is higher at a lower crystallinity such as seen in butyl rubber. Because of these contradictory tendencies, it is difficult to satisfy all the desired properties simultaneously.

SUMMARY OF THE INVENTION

One object of the present invention is to provide a polyethylene based crosslinked foam satisfactory in impact absorbability and vibration absorbability as well as in cushionability, in a wide range of crosslinking degrees.

Accordingly, the invention provides an impact and vibration absorbable crosslinked foam having good impact absorbability and vibration absorbability, which comprises;

a polyolefin based resin (A) and, a conjugated diene polymer (B) having a peak tan δ value (obtained by dynamic viscoelasticity measurement) between −20° C. and 40° C.

In a preferred embodiment of the invention, the crosslinked foam has an impact absorbability of 10–50% and 0.1% or more of vibrational absorbability, and contains 100 parts by weight of the polyolefin based resin (A) and 10–100 parts by weight of the conjugated diene polymer (B).

The invention also provides a method for manufacturing an impact and vibration absorbable crosslinked foam, comprising;

(a) mixing a polyolefin based resin (A) and a conjugated diene polymer (B) having a peak tan δ value (obtained by dynamic viscoelasticity measurement) between −20° C. and 40° C., and (b) foaming the mixture.

DETAILED DESCRIPTION OF THE INVENTION

To obtain an impact and vibration absorbable foam, we tested resins to be mixed with the polyolefin based resin (A) and auxiliary agent for crosslinking, and correlated the peak temperature of tan δ (obtained by the dynamic viscoelasticity measurement) of the resin with the behavior caused when both the resins are crosslinked. As a result, we found a polyolefin based crosslinked foam satisfactory in impact absorbability and vibration absorbability as well as in moldability, heat resistance and cushionability, over a wide range of degrees of crosslinking. It is attained by reducing the effect of crystallinity of the polyolefin based resin and control the impact resilience.

The polyolefin based resin (A) used in the present invention is preferably selected from homopolymers or random or block copolymers of olefin monomers such as ethylene, propylene, butene 1,4-methyl pentene-1, or their copolymers such as with vinyl acetate, acrylic esters, methacrylic esters, maleic acid anhydride. The melting point of the polyolefin based resin (A) should be 70° to 165° C., preferably, 80° to 155° C. If the melting point is lower than 70° C., although it is preferable in view of softness, impact absorbability and vibration absorbability of the product and prevention of decomposition of foaming agent while kneading in an extruder during a sheet manufacturing process, the product is too soft and difficult to be handled at taking up or after treatment, or is unstable during manufacturing, for instance, due to blocking. On the other hand, when the melting point is higher than 165° C., although heat resistance can be improved, it is difficult to exactly control the expansion ratio of the product due to the decomposition of the foaming agent by shear-induced heat while kneading in the extruder. The melt flow rate (MFR) of the resin (A) should be 0.5 to 20 g/10 min., preferably, 1.5 to 10 g/10 min. If MFR is less than 0.5 g/10 min., the melt viscosity of resin becomes too high, and the expansion ratio cannot be exactly controlled due to the decomposition of the foaming agent caused by higher extrusion temperature to reduce the melt viscosity or higher extrusion pressure. On the other hand, when the MFR is more than 20 g/10 min., although it is preferable in view of prevention of decomposition of the foaming agent caused by shear-induced high temperature, it is not generally preferable since a predetermined surface condition and thickness of the product cannot be obtained without using a particularly prepared manufacturing line (i.e., a plant having a quick cooling system).

The conjugated diene based polymer (B) has a peak tan δ within a temperature range of −20° C. to 40° C. (obtained by dynamic viscoelasticity measurement) and a number average molecular weight of 30,000 to 500,000. It may be a fully unsaturated or partially hydrogenated product and in particular, may be a copolymer of an aromatic vinyl monomer, isoprene and butadiene, or a partially hydrogenated product thereof. The aromatic vinyl monomer content in the conjugated diene based polymer or its hydrogenated product should be 5 to 50%, preferably 10 to 35%. If the aromatic vinyl monomer content is more than 50%, the temperature range of the peak of tan δ shifts toward a lower temperature, to harden the resin itself, and brings about a lowering of the impact absorbability and vibration absorbability undesirably. If the content is less than 5%, the temperature range of the peak of tan δ shifts toward a higher temperature, to improve the flexibility as a rubber material for seemingly enhancing impact absorbability. However, in the present invention, since the crosslinked foam is high in expansion ratio, excessive flexibility causes the foam to be excessively deformed so as, on the contrary, to lower impact absorbability undesirably. The aromatic vinyl monomer used in the present invention can be selected from styrene based monomers and naphthalene based monomers, but styrene based monomers are preferable in view of productivity and price. The amounts of isoprene and butadiene in the conjugated diene based polymer of the present invention are each 5 to 90%. The hydrogenated ratio of the conjugated diene based polymer is preferably less than 90%, more preferably less than 80%, and most preferably less than 70%. If the amount of those monomers in the copolymer is more than 90%, crosslinking degree tends to be low and quality control of the foam, especially bubble size, becomes difficult.

The peak of tan δ obtained by dynamic viscoelasticity measurement, should be in a temperature range from −20° C. to 40° C., more preferably −5° C. to 35° C. If the peak is outside this temperature range, the foam obtained is undesirably poor in impact absorbability and vibration absorbability. The number average molecular weight of the conjugated diene based polymer should be 30,000 to 500,000, preferably 50,000 to 200,000. If the molecular weight is less than 30,000, the foam obtained is low in mechanical strength and very sticky, and blocking occurs in the production of the foam undesirably. On the other hand, if more than 500,000, the melt viscosity of the resin is too high, and when it is melt-mixed with the polypropylene based resin, dispersibility is too low due to the difference in viscosity, not allowing for foaming control of the foam.

The method for preparing the conjugated diene based polymer used in the present invention is typically disclosed in JP-A-5-345833 but, of course, not limited thereto in the present invention.

When polyethylene is used as the polyolefin based resin (A) in the present invention, there are no particular restrictions as to its production method. In general, it can be selected from low density polyethylene obtained by high pressure polymerization, linear polyethylene based resins such as a copolymer of ethylene and an α-olefin with 4 to 12 carbon atoms obtained by low or medium pressure ion polymerization, ethylene vinyl acetate copolymer, ethylene alkyl acrylate copolymers, ternary copolymers with maleic anhydride, etc. Preferably, the polyethylene based resin is selected from resins which can be crosslinked by electron beam irradiation only, without requiring the addition of a reactive crosslinking auxiliary such as divinylbenzene. The reason is that while the conjugated diene based polymer to be mixed has double bonds in the skeleton and crosslinked by electron beam irradiation, controlling the crosslinked state suitable for foaming requires that the respective resins are not greatly different in crosslinking degree at the same energy. Any one or more of the above polyethylene based resins can be used without any limitation as far as a large difference in their respective degrees of crosslinking is not caused.

The melting point of the polyethylene based resin used in the present invention should be 70° to 135° C., preferably 80° to 130° C. Melting points of lower than 70° C. are undesirable since application of such means is limited in view of heat resistance. Melting points higher than 135° C. are preferable in view of a wider range of applicability of such resins, but undesirable since substantially highly crystalline resin is highly rigid and makes the foam less cushionable.

The MFR of a polyethylene based resin as used for the present invention should be 0.5 to 10 g/10 min, preferably 1.0 to 8 g/10 min. If MFR is less than 0.5 g/10 min, the melt viscosity of the resin is so high as being liable to cause the foaming agent to be undesirably decomposed, thereby forming coarse bubbles, by the shear heat generation during the production of the sheet to be foamed. On the other hand, if more than 10 g/10 min, although the melt viscosity is desirably low for the production of the sheet, the foam obtained is lowered in elongation, or the shape retainability during heat molding such as vacuum molding is lowered, making it difficult to obtain a good molded product.

If polypropylene based resin is used as the polyolefin based resin (A) in the present invention, it is generally a block copolymer of polypropylene with 2 to 35 wt %, preferably 3 to 20 wt % of ethylene or an α-olefin having 4 to 12 carbon atoms in its molecule. If the amount of comonomer is less than 2%, the impact or vibration absorbing effect is not enough. On the other hand, if the amount is more than 35 wt %, although it is preferable in view of control of crosslinking, impact absorbability, resiliency and cushionability, melting point becomes too low.

The polyolefin based resin (A) has a melting point of 125° to 165° C., preferably 130° to 155° C., and an MFR of 0.5 to 20 g/10 min, preferably 1.0 to 10 g/10 min. If the melting point is below 125° C., heat resistance is too low, and if the melting point is over 165° C., shear-induced heat at manufacturing causes decomposition of foaming agent and brings about large voids which are not preferable. If MFR is less than 0.5 g/10 min, too high a melt viscosity causes shear-induced heat, decomposition of foaming agent and unpreferable large voids in the foam. On the other hand, if MFR is more than 20 g/10 min, although it is preferable in view of sheet manufacturing, the elongation of the foam tends to be too low, and at molding at high temperature, the sheet tends to deform and it is difficult to maintain good quality.

The ethylene or α-olefin with 4 to 12 carbon atoms being copolymerized is not especially limited, and can be ethylene, butene or hexene respectively alone, or ethylene and butene, or ethylene and hexene respectively in combination, etc. In view of the mechanical strength of the foam, a copolymer having as large a number of carbon atoms as possible and a ternary copolymer are preferable. The amount of the ethylene or an α-olefin with 4 to 12 carbon atoms to be copolymerized should be 2 to 35 wt %, preferably 3 to 8 wt %. If the amount is less than 2 wt %, the crystallinity of the resin is very high, making it undesirably difficult to control the impact absorbability and vibration absorbability contrary to the intention of the present invention. Furthermore, since the melting point becomes high, the foam obtained is hard, lowering cushionability, large in impact resilience, and poor in impact resistance at low temperature, and when the sheet to be foamed is produced, the foaming agent is liable to be decomposed by shear heat generation, undesirably forming coarse bubbles. On the other hand, if the amount is more than 35 wt %, the melting point is lowered undesirably to lower heat resistance, even though a large amount is preferable for controlling the crosslinked state, cushionability, impact resilience and impact resistance. The melting point of the resin should be 125° to 155° C., preferably 130° to 145° C. If the melting point is lower than 125° C., the foam obtained is undesirably limited in application in view of heat resistance. If higher than 155° C., even though widening the range of possible application, it is nonetheless unpreferred since the shear heat generation during the production of the sheet to be foamed is liable to cause the foaming agent to be decomposed, thereby undesirably forming coarse bubbles. The MFR is 0.5 to 20 g/10 min, preferably 1.0 to 10 g/10 min. If MFR is less than 0.5 g/10 min, the melt viscosity of the resin is so high as being liable to cause the foaming agent to be undesirably decomposed, thereby forming coarse bubbles by the shear heat generation during the production of the sheet to be foamed. On the other hand, if more than 20 g/10 min, although the melt viscosity is desirably low for the production of the sheet, the foam obtained is lowered in elongation, or its shape retainability during heat molding such as vacuum molding is lowered, making it undesirably difficult to obtain a good molded product.

Usually, polypropylene based resin tends to decompose at the tertially carbon atom of polypropylene when irradiated by ionizing irradiation such as electron beam. This decomposition may be prevented by adding 0.5 to 5 wt parts of monomer or dimer having two or more reactive double bonds in its molecule relative to 100 wt parts of the propylene based resin. If the amount is less than 0.5 wt parts, crosslinking degree must substantially depend upon the reactivity of the diene based polymer and accordingly cannot be high enough. On the other hand, if the amount is more than 5 wt parts, uniform crosslinked product is hard to be obtained because of the difference of the speed of the two crosslinking reactions.

When a mixture of polyethylene based resin (a) and polyethylene based resin (b) is used as resin (A) of this invention, a ratio (a)/(a+b) of 0.2 to 0.8 is preferable in view of controlling softness, heat resistance, vibration absorbability and impact absorbability.

The coefficient of the mixing ratio (B)/(A+B) of the (A) polyolefin based resin and the (B) conjugated diene based polymer or its hydrogenated product should be 0.1 to 0.5, preferably 0.2 to 0.4. If (B)/(A+B) is less than 0.1, the crystallinity of the polyolefin based resin brings about high rigidity, heat resistance, but with low impact and vibration absorbability and cushionability. On the other hand, if more than 0.5, impact absorbability and vibration absorbability are not greatly improved, though the reason is unknown, and mechanical properties such as strength are lowered undesirably due to an increased amorphous component.

The number average molecular weight of the diene based polymer should be 30,000 to 500,000. If it is less than 30,000, although it is preferable in view of vibration absorbability, the resin is too liqueous and causes too low melt viscosity of the compound, accordingly, it becomes difficult to form a continuous sheet or to prevent blocking. On the other hand, if it is more than 500,000, shear-induced heat at melting causes uncontrollable decomposition of the foaming agent.

The crosslinking degree of the foam of the present invention is preferably 15 to 80%, preferably 30 to 60%. Crosslinking degrees of less than 15% are preferable in view of elongation and moldability, but undesirable since the foam gas is liable to dissipate from the surface of the foam during foaming at such a low crosslinking degree, not allowing the intended expansion ratio to be obtained, and also roughening the surface of the foam, and furthermore, lowering heat resistance undesirably. On the other hand, while crosslinking degrees higher than 80% are preferable for the impact absorbability, vibration absorbability, mechanical strength and heat resistance of the conjugated diene polymer as a rubber component, but substantially lower moldability, so that molding into various shapes cannot be effected.

The expansion ratio of the present invention should be 2 to 40 times, preferably 5 to 30 times. Expansion ratios less than 2 times are preferable in view of vibration absorbability, mechanical strength and moldability, but undesirable since the foam obtained is hard and low in impact absorbability and cushionability. On the other hand, expansion ratios of more than 40 times are preferable in view of cushionability due to higher flexibility, but undesirable since mechanical strength and moldability are lowered, and since also vibration absorbability is lowered, though the reason for this is unknown.

The impact resilience as the impact absorbability of the present invention should be 10 to 50%, more preferably 15 to 35%. Impact resilience values of less than 10 are preferable in view of impact absorbability, but the foam obtained is not firm and cannot hold its shape. On the other hand, impact resilience values of higher than 50% are preferable in view of moldability since the foam obtained can hold its shape, but undesirable since the repulsion against impact increases to undesirably lower impact absorbability.

The vibration absorbability (C/Cc) of a foam of the present invention should be 0.1% or more. If the vibration absorbability is less than 0.1%, when the foam is used with a wide range of materials to make composite products, it cannot give good vibration absorbability, i.e., damping effect. The upper limit of vibration absorbability is about 1.5%, since at higher levels foam is not firm and cannot to hold its shape.

The foam of the present invention preferably has moldability (L/D) of 0.4 or more, more preferably 0.5 to 0.9, in said range of crosslinking degrees. If the moldability (L/D) is less than 0.4, a complicatedly shaped product cannot be obtained and/or it undesirably restricts the molding method and molding design. On the other hand, larger L/D values are preferable in view of the degree of freedom in molding method and molding design, but generally the upper limit of L/D can be said to be about 0.9 in view of the shape moldability and cushionability of the molded product.

Molding processability (L/D) may be calculated as follows: cylindrical metal molds of which the depth (L)/diameter (D) ratio varies at intervals of 0.05 are used. A foam or laminated sheet is vacuum-molded at 160° to 180° C. by a vacuum molding machine. The maximum ratio at which the foam forms a molding without any breaks is determined as the value of molding processability, molding processability (L/D)=L/D.

In addition, as required, a thermal stabilizer, weather resistant material, flame retarding agent, flame retarding auxiliary, dispersing agent, pigment, and filler can be added. The thermal stabilizer can be selected from hindered phenol based stabilizers and thio based stabilizers, and considering the use in combination with a metallic plate, it is preferable to add a metallic damage preventive as far as possible, in order to prevent deterioration of polypropylene foam when contacted by copper. It is also effective to add 5 to 30 wt parts of micro particles, such as of talc, calcium carbonate, mica, carbon to the resin composition relative to 100 wt parts of the resin composition to improve vibration absorbability. In view of the recent environmental issues, the use of olefins as raw materials is increasing, and depending on the places where the foam is used, a flame retarding agent or flame retarding auxiliary must be added. For the crosslinked foam, the use of a flame retarding agent of 180° to 240° C. in melting point, above all, a phosphorus halogen based flame retarding agent is desirable.

The decomposition type foaming agent which can be applied in the present invention can be selected from various organic and inorganic foaming agents. Organic foaming agents include azodicarbonamide, N,N'-dinitrosopentamethylenetetramine, P,P'-hydroxybenzenesulfonyl hydrazide, triazol type or tetrazol type having a chlorine atom etc., and inorganic foaming agents include sodium carbonate, ammonium carbonate, ammonium bicarbonate, calcium azide, etc. Among these, a mixture of azodicarbonamide and N,N'-dinitrosopentamethylenetetramine is especially preferred because the decomposition of the resin compound can be minimized, since uniform foaming with a low temperature is achieved. Azoditetrazol guanidine can also be used instead of N,N'dinitrosopentamethylenetetramine for the same purpose.

In the present invention, crosslinking by irradiation with ionizing radiation is preferable. As a chemical crosslinking method, it is known to add 0.5 to 5 parts of a peroxide compound such as dicumyl peroxide, t-butyl perbenzoate, or di-tertiary butyl peroxide in the resins for crosslinking, but this method often deteriorates the polyolefin based resin and does not allow for control of crosslinking.

The foaming method of the present invention can be a known method, but a continuous sheet, such as vertical hot air foaming, horizontal hot air foaming or horizontal chemical solution foaming is preferable.

An especially preferred embodiment of the method for producing the polyolefin based, electron beam crosslinked, foam of the present invention is described below.

Fifty kilograms of (A) a high pressure process low density polyethylene (0.925 g/cm$^3$ in density, 112° C. in melting point and 4.8 g/10 min in MFR), 30 kg of (B) a hydrogenated styrene-isoprene-styrene block copolymer having a peak of tan δ of −30° C., a number average molecular weight of 55,000 and a 10% styrene content, 0.3 kg of IRGANOX 1010 as a thermal stabilizer and 6.5 kg of azodicarbonamide as a decomposition type foaming agent were put into a Henschel mixer of 450 liters inner capacity, and mixed, to obtain a composition. The raw mixture was introduced into a vent-type extruder heated to a temperature not decomposing the foaming agent (130° to 150° C.), and extruded from its nozzle (3 mm in bore) into a water cooling tank, and the strand gut was drawn out of the water cooling tank, exposed to compressed air for draining, and introduced into a pelletizer, and pelletized into pellets of 2 mm in diameter and 3 mm in length, thereby providing a raw material for the sheet to be foamed. The raw material was next, introduced into an extruder heated at 130° to 150° C., and extruded from its nozzle, and the extruded material was fed into a polishing type sheet molding machine of 65° C. in roll temperature. The molded sheet was wound as a 3.0 mm thick and 500 mm wide continuous sheet free from bubbles caused by entrained air.

The sheet was irradiated with an electron beam, to be crosslinked suitably for foaming, i.e., in order that the crosslinking degree of the foam obtained might be 15 to 80%. The sheet was continuously supplied onto a heating medium bath heated in a temperature range from 30° to 100° C. higher than the decomposition temperature of the foaming agent, and foamed.

The foam thus obtained was 6.1 mm in thickness, 1300 mm in width and 25 times in expansion ratio, and smooth on the surface.

As described above, in the present invention, a specific conjugated diene based polymer is mixed with a polyethylene based resin, and the mixture is crosslinked and foamed into a product having a decreased impact resilience attributable to the crystallinity of the polyolefin based resin also being yet with the properties of the polyolefin based resin kept in a wide range of crosslinking degrees, and excellent in cushionability, impact absorbability and vibration absorbability.

The reason why the effects of the present invention are obtained is not fully understood. Although not wishing to be bound by theory, according to the experience of the inventors, when a rubber resin is mixed with a polyolefin based resin, the amount of the rubber resin added must not be less than the amount of the polyolefin based resin, in order that the properties of the rubber resin should manifest themselves, and therefore, it is very difficult to keep the properties of the polyolefin based resin. On the other hand, a polyethylene based resin copolymerized with a rubber component, for example EVA resin, can be further lowered in crystallinity by a small amount of the copolymerized rubber component, to be made flexible, but the impact absorbability and vibration absorbability are not satisfactory. In the present invention, it is surmised that since a specific conjugated diene based polymer resin and a polyolefin based resin are mixed, crosslinked and foamed, the resins are crosslinked with each other in a state that the conjugated diene based polymer resin and the polyolefin based resin appear to have been copolymerized, and so that the amount of the conjugated diene based polymer resin added can be smaller, to give impact absorbability and vibration absorbability without lowering the basic properties of the polyolefin based resin.

Since the foam of the present invention is small in impact resilience, it is excellent in impact absorbability, and also vibration absorbability. Therefore, if it is stuck to various facings for use as interior materials of automobiles, the interior materials obtained will have peculiar softness, impact absorbability, and delicate vibration absorbability with damping effect which cannot be achieved by conventional foams.

Furthermore, since it is excellent in vibration absorbability, the foam materials can be stuck to inflammable materials such as iron sheets, for use in molded engine room partitions, or can be stuck to an inorganic fiber mat for use as a lining material for inflammable board. They can also be stuck to a metallic sheet, to form a laminate which can be folded for use as an outside plate of washing machine, etc. They can also be stuck to a plastic sheet, to form a laminate which can be molded for use as a cover of washing machine, etc. as a damping composite material to absorb vibration, or, used to make composites with vibration absorbing sheets which comprise rubber or polyvinylchloride and metal particles, for absorbing low frequency. The foams can also be coated with an adhesive at least on one side, for use as a tape for damping the vibration of windows, etc. They can also be laminated with a plywood, etc. for use as floor damping materials. They can also be used to make composite materials with metallic foils, films, inorganic fibers, etc. for application in various molding areas.

The methods for measuring physical properties and criteria in the present invention are as follows.

(1) Crosslinking degree

A foam was shredded, and 0.2 g of it was accurately weighed. It was immersed in tetralin of 130° C., and with stirring, the mixture was heated for 3 hours, to dissolve what could be dissolved. The insoluble portion was taken out and washed by acetone, to remove tetralin, and washed by pure water to remove acetone. Water was removed by a hot air dryer of 120° C. The residue was naturally cooled to room temperature, and weighed as $W_1$ (g), to obtain the crosslinking degree from the following formula:

Crosslinking degree=[(0.2−$W_1$)/0.2]×100 (%)

(2) Expansion ratio

A 10×10 cm sample was cut out of the foam, and its thickness $t_1$ (cm) and weight $W_2$ (g) were measured. The expansion ratio of the present invention was calculated from the following formula:

Expansion ratio=[(10×10×$t_1$)/$W_2$],

For completeness, it is noted that, in the expansion ratio calculations, the density of the starting material is usually ignored, since the density of polyethylene or polypropylene is nearly 1.0.

(3) Melting point

The largest peak in the melt heat absorption curve measured by a differential scanning calorimeter (DSCII produced by Perkin Elmer) was identified as the melting point.

(4) MFR (melt flow rate)

Polyethylene based resins were measured according to JIS K 6760.

(5) Dynamic viscoelasticity

The viscoelastic spectrum of "LEOVIBRON" (produced by Orientec) DDV-III was measured, and the peak temperature of the spectral curve was identified as the absorption peak of tan δ.

(6) Impact absorbability

The value measured by "Luepke" impact resilience measuring instrument (measuring temperature 25° C.) was used.

(7) Vibration absorbability

A complex elastic modulus measuring instrument was used to measure the damping coefficient ratio C/Cc of viscous damping coefficient C to critical viscous damping coefficient Cc of a steel plate (1 mm thick, 15 mm×250 mm) only. A sample of the same size was stuck to the steel plate, and the laminate was held as a cantilever at a fixing compression rate of 75% (the thickness of the compressed sample to the thickness of the original entire sample including the thickness of the steel plate), to measure C/Cc. The value of the steel plate only was subtracted from value obtained from the laminate consisting of the sample and the steel plate was identified as vibration absorbability. The measuring temperature for vibrational absorbability is 20° C.

(8) Cushionability

The compressive hardness measured according to JIS K 6767 was used as an indicator of cushionability. A cushionability in a range from 0.30 to 1.2 kg/cm² was accepted.

Embodiments of the present invention are described below based on examples.

EXAMPLE 1

Fifty kilograms of high pressure process low density polyethylene powder (0.925 g/cm³ in density, 113° C. in melting point and 4.3 g/10 min MFR), 25 kg of hydrogenated styrene-isoprene-styrene block copolymer resin having a peak tan δ of −3° C., a number average molecular weight of 55,000 and a 10% styrene content, 0.5 kg of Mark A030 and 1.0 kg of DSTDP as thermal stabilizers, and 8 kg of azodicarbonamide as a decomposition type foaming agent were put into a Henschel mixer of 450 liters inner capacity, and mixed. The mixture was introduced into a vent type extruder heated to a temperature not decomposing the foaming agent (130° to 140° C.), and extruded from its T die as a sheet. The sheet was wound as a 2.0 mm thick 450 mm wide continuous sheet free from the bubbles caused by entrained air.

The sheet was irradiated with an electron beam of 3.5 Mrad, to be crosslinked. The sheet was introduced into a foaming apparatus using the silicon chemical solution method and heated to 205° C., 215° C. and 220° C. in this order, to be foamed, and the continuous sheet-like foam obtained was wound.

The foam was made into a product having a degree of crosslinking of 23%, an expansion ratio of 25 times, 4.2 mm in thickness and 1250 mm in width.

The properties of the product are shown in Table 5.

As shown in the table, the foam was in conformity with the present invention, was a polyolefin based electron beam crosslinked foam excellent in impact absorbability and vibration absorbability.

EXAMPLES 2 TO 5, AND COMPARATIVE EXAMPLES 1 TO 5

The ingredients as shown in Tables 1 to 4 were used to obtain foams, and the properties of the foams are shown in Table 5.

The polyolefin based electron beam crosslinked foams embodying the present invention and shown in the examples were excellent in impact absorbability and vibration absorbability over a wide range of degrees of crosslinking since they were prepared by mixing a polyolefin based resin and a conjugated diene based polymer (with a specific dynamic viscoelasticity), and crosslinking and foaming the mixture.

On the other hand, the polyolefin based electron beam crosslinked foams prepared according to conventional methods or otherwise not in conformity with the present invention, shown as comparative examples were insufficient in impact absorbability and vibration absorbability, because of improper resins and other materials used.

Each publication and patent cited herein is incorporated herein by reference, in its entirety.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| | Polyolefin based resin (A) | | | Mixing ratio (by weight) | |
|---|---|---|---|---|---|
| Example | Polyethylene based resin (a) | Polypropylene based resin (b) | Conjugated diene based polymer (B) | (B)/(A + B) | (a)/(a + b) |
| 1 | LDPE<br>density 0.925 g/cm³<br>Mp: 113° C.<br>MFR: 4.3 g/10 min | | Hydrogenated (75%) SIS<br>Styrene content: 10%<br>Molecular weight: 55,000<br>tanδ peak temperature: −3° C. | 0.33 | |
| 2 | EVA<br>VA content 15%<br>Mp: 83° C.<br>MFR: 5.0 g/10 min | | SIS block copolymer<br>Styrene content: 10%<br>Molecular weight: 50,000<br>tanδ peak temperature: 2° C. | 0.20 | |

TABLE 1-continued

| | Polyolefin based resin (A) | | | Mixing ratio (by weight) | |
|---|---|---|---|---|---|
| Example | Polyethylene based resin (a) | Polypropylene based resin (b) | Conjugated diene based polymer (B) | (B)/(A+B) | (a)/(a+b) |
| 3 | | R-EPC<br>Ethylene content: 4.8%<br>Mp: 138° C.<br>MFR: 1.5 g/10 min | Hydrogenated (75%) SIS<br>Styrene content: 10%<br>Molecular weight: 55,000<br>tanδ peak temperature: −3° C. | 0.40 | |
| 4 | LDPE<br>density 0.925 g/cm³<br>Mp: 113° C.<br>MFR: 4.3 g/10 min | B-EPC<br>Ethylene content: 10%<br>Mp: 150° C.<br>MFR: 4.2 g/10 min | SI copolymer<br>Styrene content: 10%<br>Molecular weight: 170,000<br>tanδ peak temperature: 30° C. | 0.50 | 0.60 |
| 5 | EVA<br>VA content 15%<br>Mp: 83° C.<br>MFR: 5.0 g/10 min | R-EPC<br>Ethylene content: 2.3%<br>Mp: 145° C.<br>MFR: 3.5 g/10 min | Hydrogenated (75%) SIS<br>Styrene content: 10%<br>Molecular weight: 55,000<br>tanδ peak temperature: −3° C. | 0.15 | 0.40 |

LDPE: High pressure process low density polyethylene
EVA: Ethylene-vinyl acetate copolymer
R-EPC: Ethylene-propylene random copolymer
B-EPC: Ethylene-propylene block copolymer
SIS: Styrene-isoplene-styrene block copolymer
SI: Styrene-isoplene copolymer
L-LDPE: Linear high pressure process low density polyethylene
EPDM: Ethylene-propylene-dien copolymer

TABLE 2

| Example | Foaming agent | Sheet dimensions | Crosslinking method | Foaming method | Thickness and width of foam |
|---|---|---|---|---|---|
| 1 | Azodicarbonamide<br>12 wt parts | 1.7 mm thick<br>430 mm width | Electron beam irradiation<br>9 Mrad | Horizontal chemical liquid | 4.0 mm thick<br>1200 mm width |
| 2 | Azodicarbonamide<br>6 wt parts | 1.75 mm thick<br>480 mm width | Electron beam irradiation<br>12 Mrad | Horizontal chemical liquid | 3.5 mm thick<br>1080 mm width |
| 3 | Azodicarbonamide<br>10 wt parts | 1.50 mm thick<br>500 mm width | Electron beam irradiation<br>8 Mrad | Vertical flow of hot air | 3.0 mm thick<br>1280 mm width |
| 4 | Azodicarbonamide<br>5 t parts<br>Dinitrsopenta-methylene tetramine<br>0.5 wt parts | 1.75 mm thick<br>550 mm width | Electron beam irradiation<br>10.9 Mrad | Horizontal chemical liquid | 3.2 mm thick<br>1000 mm width |
| 5 | Azodicarbonamide<br>8 wt parts | 1.85 mm thick<br>520 mm width | Electron beam irradiation<br>13 Mrad | Vertical flow of hot air | 4.0 mm thick<br>1150 mm width |

TABLE 3

| | Polyolefin based resin (A) | | | Mixing ratio (by weight) | |
|---|---|---|---|---|---|
| Example | Polyethylene based resin (a) | Polypropylene based resin (b) | Conjugated diene based polymer (B) | (B)/(A+B) | (a)/(a+b) |
| 1 | LDPE<br>density 0.925 g/cm³<br>Mp: 113° C.<br>MFR: 4.3 g/10 min | R-EPC<br>Ethylene content: 2.3%<br>Mp: 145° C.<br>MFR: 3.5 g/10 min | | 0.00 | 0.8 |
| 2 | L-LDPE<br>density: 0.935 g/cm³<br>Mp: 125° C.<br>MFR: 5.0 g/10 nin | | SIS<br>Styrene content: 10%<br>Molecular weight: 50,000<br>tanδ peak temperature: 2° C. | 0.20 | 1.0 |
| 3 | L-LDPE<br>density: 0.935 g/cm³<br>Mp: 125° C.<br>MFR: 5.0 g/10 min | | EPDM<br>Ethylene content: 10%<br>Molecular weight: 65,000<br>tanδ peak temperature: −35° C. | 0.50 | 0 |

TABLE 3-continued

| | Polyolefin based resin (A) | | | Mixing ratio (by weight) | |
|---|---|---|---|---|---|
| Example | Polyethylene based resin (a) | Polypropylene based resin (b) | Conjugated diene based polymer (B) | (B)/(A+B) | (a)/(a+b) |
| 4 | | R-EPC<br>Ethylene content: 2.3%<br>Mp: 145° C.<br>MFR: 3.5 g/10 min | SIS<br>Styrene content: 10%<br>Molecular weight: 50,000<br>tanδ peak temperature: 2° C. | 0.50 | 0 |
| 5 | EVA copolymer<br>VA content 15%<br>Mp: 83° C.<br>MFR: 5.0 g/10 min | R-EPC<br>Ethylene content: 2.3%<br>Mp: 145° C.<br>MFR: 3.5 g/10 min | Hydrogenated (100%) SIS<br>Styrene content: 10%<br>Molecular weight: 55,000<br>tanδ peak temperature: −3° C. | 0.15 | 0.10 |

LDPE: High pressure process low density polyethylene
EVA: Ethylene-vinyl acetate copolymer
R-EPC: Ethylene-propylene random copolymer
B-EPC: Ethylene-propylene BLOCK copolymer
SIS: Styrene-isoplene-styrene block copolymer
SI: Styrene-isoplene copolymer
L-LDPE: Linear high pressure process low density polyethylene
EPDM: Ethylene-propylene-dien copolymer

TABLE 4

| Example | Foaming agent | Sheet dimensions | Crosslinking method | Foaming method | Thickness and width of foam |
|---|---|---|---|---|---|
| 1 | Azodicarbonamide<br>12 wt parts | 1.7 mm thick<br>430 mm width | Electron beam irradiation<br>9 Mrad | Horizontal<br>chemical liquid | 4.0 mm thick<br>1200 mm width |
| 2 | Azodicarbonamide<br>6 wt parts | 1.75 mm thick<br>480 mm width | Electron beam irradiation<br>12 Mrad | Horizontal<br>chemical liquid | 3.5 mm thick<br>1080 mm width |
| 3 | Azodicarbonamide<br>10 wt parts | 1.50 mm thick<br>500 mm width | Electron beam irradiation<br>8 Mrad | Vertical flow<br>of hot air | 3.0 mm thick<br>1280 mm width |
| 4 | Azodicarbonamide<br>5 wt parts<br>Dinitrsopenta-<br>methylene tetramine<br>0.5 wt parts | 1.75 mm thick<br>550 mm width | Electron beam irradiation<br>10.9 Mrad | Horizontal<br>chemical liquid | 3.2 mm thick<br>1000 mm width |
| 5 | Azodicarbonamide<br>8 wt parts | 1.85 mm thick<br>520 mm width | Electron beam irradiation<br>13 Mrad | Vertical flow<br>of hot air | 4.0 mm thick<br>1150 mm width |

TABLE 5

| | Cross-linking degree (%) | Expansion ratio (times) | Impact absorbability (%) | Vibration absorbability (%) | Mold-ability (L/D) |
|---|---|---|---|---|---|
| Example | | | | | |
| 1 | 30 | 7 | 40 | 0.3 | 0.85 |
| 2 | 45 | 12 | 38 | 0.15 | 0.76 |
| 3 | 55 | 5 | 30 | 0.4 | 0.62 |
| 4 | 35 | 7 | 35 | 0.46 | 0.76 |
| 5 | 40 | 9 | 24 | 0.39 | 0.68 |
| Comparative Example | | | | | |
| 1 | 55 | 2.5 not well-foamed | 78 | 0.44 | 0.42 |
| 2 | 80 | 3.5 not well-foamed | 64 | 0.05 | 0.22 |
| 3 | 20 | 4 | 58 | 0.08 | 0.80 |
| 4 | 35 | 13 | 78 | 0.08 | 0.65 |
| 5 | 35 | 35 | 69 | 0.04 | 0.80 |

Comparative Examples 1 and 2 could not form the intended foam due to voids (coarse bubbles) attributable to the excessive crosslinking degree.

What is claimed:

1. A crosslinked foam comprising:
   a resin (A), which is a polypropylene based resin having a melting point of 125° to 165° C. and a melt flow rate (MFR) of 0.5 to 20 g/10 min and/or a polyethylene based resin having a melting point of 70° to 135° C. and a melt flow rate of 0.5 to 10 g/10 min, and a conjugated diene polymer (B) having a peak tan δ value (obtained by dynamic viscoelasticity measurement) at a temperature between −20° C. and 40° C. inclusive, and an aromatic vinyl monomer content of 5 to 50%.

2. The foam according to claim 1, which is an electron beam crosslinked foam.

3. The foam according to claim 1 or 2, comprising from 10 to 100 parts by weight of component (B) per 100 parts by weight of component (A).

4. The foam according to claim 1, having an impact absorbability at 25° C. of from 10 to 50% and a vibration absorbability, as defined by the damping coefficient ratio (C/Cc), of at least 0.1%.

5. The foam according to claim 1 or 2, wherein the resin (A) is the polypropylene based resin.

6. The foam according to claim 5, wherein the polypropylene based resin is a copolymer of propylene with 2 to 35 wt % of ethylene, or a copolymer of propylene with 2 to 35 wt % of an α-olefin having 4 to 12 carbon atoms.

7. The foam according to claim 1 or 2, wherein the resin (A) is the polyethylene based resin.

8. The foam according to claim 7, wherein the resin (A) contains the polyethylene based resin in an amount (a) and the polypropylene based resin in an amount (b) in a weight ratio, (a)/(a+b), of 0.2 to 0.8.

9. The foam according to claim 1 or 2, having a degree of crosslinking of 15 to 80% and an expansion ratio (E) of 2 to 40 times, where E is the ratio of (volume per unit mass of expanded foam):(volume per unit mass of unexpanded material).

10. The foam according to claim 9, wherein the degree of crosslinking is 25 to 70% and the expansion ratio is 5 to 40 times.

11. The foam according to claim 1 or 2, wherein the conjugated diene polymer (B) comprises a styrene/isoprene block copolymer.

12. The foam according to claim 1 or 2, wherein the foam has a moldability (L/D) of 0.4 or more.

13. The foam according to claim 1 or 2, wherein the foam has a heat resistance at 120° C. of 5% or less.

14. The foam according to claim 1 or 2, wherein the conjugated diene polymer (B) has a number average molecular weight of 30,000 to 500,000.

15. The foam according to claim 1 or 2, which further comprises 0.5 to 5 parts by weight of a component (C) crosslinking agent.

16. A crosslinked foam having an impact absorbability at 25° C. of 10 to 50% and a vibration absorbability, as defined by a damping coefficient ratio (C/Cc), of at least 0.1%, and which foam comprises:

100 parts by weight of polyolefin based resin (A), which is a polypropylene based resin having a melting point of 125° to 165° C. and/or a polyethylene based resin having a melting point of 70° to 135° C., resin (A) having a melting flow rate (MFR) of 0.5 to 20 g/10 min; and 10 to 100 parts by weight of a conjugated diene polymer (B) having a peak tan δ value (obtained by dynamic viscoelasticity measurement) at a temperature between −20° C. and 40° C. inclusive, and an aromatic vinyl monomer content of 5 to 50%.

17. A method of manufacturing a crosslinked foam, comprising:

(a) mixing a polyolefin based resin (A), which is a polypropylene based resin having a melting point of 125° to 165° C. or a polyethylene based resin having a melting point of 70° to 135° C., resin (A) having a melt flow rate (MFR) of 0.5 to 20 g/10 min, with a conjugated diene polymer (B) having a peak tan δ value (obtained by dynamic viscoelasticity measurement) at a temperature between −20° C. and 40° C. inclusive, an aromatic vinyl monomer content of 5 to 50% and a number average molecular weight of 30,000 to 500,000; and (b) foaming the mixture.

18. The method according to claim 17, wherein the foam is crosslinked by electron beam curing.

19. The method according to claim 17 or 18, wherein the mixture comprises: 100 parts by weight of said polypropylene based resin or the polyethylene based resin (A), and 10 to 100 parts by weight of said conjugated diene polymer (B).

20. The method according to claim 17 or 18, wherein the resin (A) is a polypropylene based resin.

21. The method according to claim 20, wherein the polypropylene based resin has a melting point of 130° to 155° C.

22. The method according to claim 17 or 18, wherein the polypropylene based resin is a copolymer of propylene with 2 to 35 wt % of ethylene, or a copolymer of propylene with 2 to 35 wt % of an α-olefin having 4 to 12 atoms.

23. The method according to claim 17 or 18, wherein the resin (A) is the polyethylene based resin.

24. The method according to claim 17 or 18, wherein the polyolefin based resin (A) comprises the polyethylene based resin in an amount (a) and the polypropylene based resin in an amount (b) in a weight ratio, (a)/(a+b), of 0.2 to 0.8.

25. The method according to claim 17 or 18, wherein the foam has a degree of crosslinking of 15 to 80% and an expansion ratio (E) of 2 to 40 times, wherein E is the ratio of (volume per unit mass of expanded foam):(volume per unit mass of unexpanded material).

26. The method according to claim 25, wherein the foam has a degree of crosslinking of 25 to 70% and an expansion ratio of 5 to 40 times.

27. The method according to claim 17 or 18, wherein the conjugated diene polymer (B) comprises a styrene/isoprene block copolymer.

28. The method according to claim 17 or 18, wherein the foam has a moldability (L/D) of 0.4 or more.

29. The method according to claim 17 or 18, wherein the foam has a heat resistance at 120° C. of 5% or less.

30. The method according to claim 17 or 18, wherein the conjugated diene polymer (B) has a number average molecular weight of 30,000 to 500,000.

31. The method according to claim 17 or 18, wherein the reaction mixture further comprises 0.5 to 5 parts by weight of a component (C) crosslinking agent.

32. The foam according to claim 5, wherein the polypropylene based resin has a melting point of 130° to 155° C.

33. The foam according to claim 7, wherein the polyethylene based resin has a melting point of 80° to 130° C.

34. The method according to claim 23, wherein the polyethylene based resin has a melting point of 80° to 130° C. and a melt flow rate of 0.5 to 10 g/10 min.

* * * * *